United States Patent
Leone et al.

(10) Patent No.: US 9,081,403 B1
(45) Date of Patent: Jul. 14, 2015

(54) OPTIMAL COMPENSATING RAMP GENERATOR FOR FIXED FREQUENCY CURRENT MODE DC-DC CONVERTERS

(71) Applicant: Maxim Integrated Products, Inc., San Jose, CA (US)

(72) Inventors: Salvatore Leone, Catanzaro (IT); Andrea Milanesi, Milan (IT)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 211 days.

(21) Appl. No.: 13/799,250

(22) Filed: Mar. 13, 2013

(51) Int. Cl.
*G05F 1/00* (2006.01)
*G05F 1/46* (2006.01)

(52) U.S. Cl.
CPC ...................................... *G05F 1/468* (2013.01)

(58) Field of Classification Search
USPC ......... 323/222, 242, 271, 282, 283, 284, 285, 323/288, 299
See application file for complete search history.

(56) References Cited

U.S. PATENT DOCUMENTS

| 7,644,721 | B2 * | 1/2010 | Hoberman et al. | 135/144 |
| 2011/0018507 | A1 * | 1/2011 | McCloy-Stevens et al. | 323/271 |
| 2012/0119718 | A1 * | 5/2012 | Song | 323/282 |

* cited by examiner

Primary Examiner — Nguyen Tran

(57) ABSTRACT

Systems and methods for generating a compensating ramp for a DC-DC converter having fixed frequency current mode control architecture are adaptive to an input voltage of the converter and an output voltage of the converter, and are programmable based on an inductor of the converter. The systems and methods include receiving the input voltage and the output voltage of the converter and outputting, based on the input voltage and the output voltage, a voltage reference or a current reference. The systems and methods include generating a voltage ramp based on the voltage reference or the current reference. A conversion gain associated with converting the voltage ramp to a compensating ramp current is set based on a user input corresponding to an inductance value of the inductor.

16 Claims, 3 Drawing Sheets

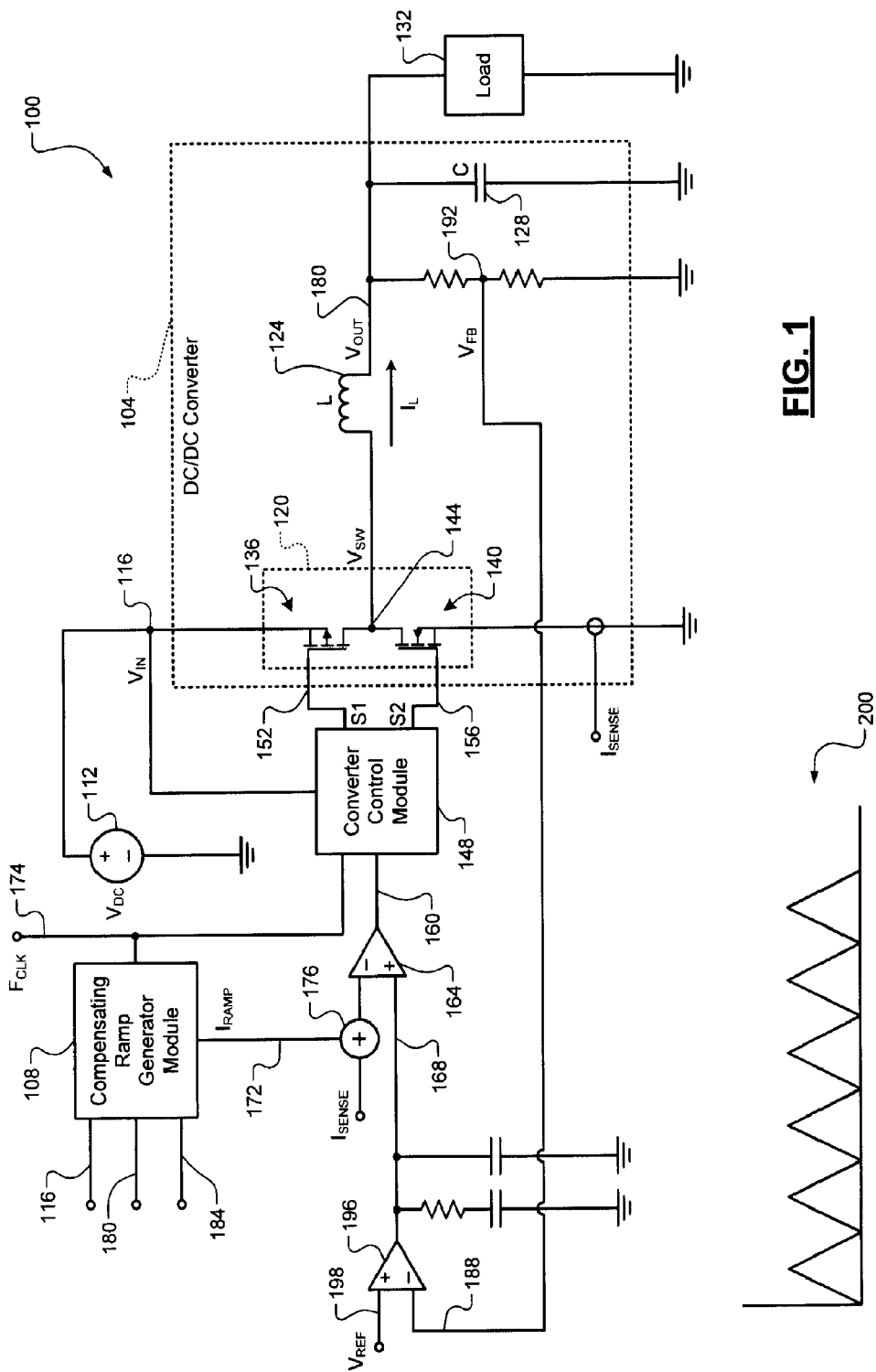

| L (µH) | Code |
|---|---|
| 33 | 00000 |
| 27 | 00001 |
| ... | ... |
| 0.24 | 11110 |
| 0.20 | 11111 |

400

OPTIMAL COMPENSATING RAMP GENERATOR FOR FIXED FREQUENCY CURRENT MODE DC-DC CONVERTERS

FIELD

The present disclosure relates to a current mode DC-DC converter, and more particularly to systems and methods to generate a compensating ramp for DC-DC converters with fixed frequency current mode control architecture.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A power supply outputs a predetermined voltage that may be used to power one or more components. For example, the predetermined voltage may power one or more components of an integrated circuit (IC). In some situations, however, a voltage that is less than the predetermined voltage may be sufficient. The lower voltage may be obtained from the predetermined voltage using a voltage divider circuit. Voltage divider circuits, however, are inefficient and inaccurate.

A direct current (DC)-DC converter such as a step-down ("buck") converter may be implemented to provide the lower voltage. Under a given set of conditions, a buck converter is generally more efficient and more accurate than a voltage divider circuit. A buck converter may include an inductor, a capacitor, and two switches. The buck converter alternates between charging the inductor by connecting the inductor to the predetermined voltage and discharging the inductor by connecting the inductor to ground.

In other situations, a voltage that is greater than the predetermined voltage may be sufficient. A DC-DC converter such as a step-up ("boost") converter may be implemented to provide the higher voltage.

SUMMARY OF THE INVENTION

A system for generating a compensating ramp for a DC-DC converter having fixed frequency current mode control architecture is adaptive to an input voltage of the converter and an output voltage of the converter, and is programmable based on an inductor of the converter. The system includes a reference slope generator module that receives the input voltage and the output voltage of the converter and that outputs, based on the input voltage and the output voltage, a voltage reference. A voltage ramp generator module receives the voltage reference and generates a voltage ramp based on the voltage reference. A ramp converter module receives the voltage ramp and a user input corresponding to an inductance value of the inductor, wherein a conversion gain associated with at least one of the voltage ramp generator module and the ramp converter module is set based on the user input, and converts the voltage ramp to a compensating ramp current.

In other features, a reference slope generator module receives the input voltage and the output voltage of the converter and that outputs, based on the input voltage and the output voltage, a current reference. A voltage ramp generator module receives the current reference and generates a voltage ramp based on the current reference. A ramp converter module receives the voltage ramp and a user input corresponding to an inductance value of the inductor, wherein a conversion gain associated with at least one of the voltage ramp generator module and the ramp converter module is set based on the user input, and converts the voltage ramp to a compensating ramp current.

A method for generating a compensating ramp for a DC-DC converter having fixed frequency current mode control architecture is adaptive to the input voltage of the converter and the output voltage of the converter, and is programmable based on the inductor of the converter. The method includes receiving the input voltage and the output voltage of the converter, outputting, based on the input voltage and the output voltage, a voltage reference, generating a voltage ramp based on the voltage reference, receiving a user input corresponding to an inductance value of the inductor, wherein a conversion gain associated with converting the voltage ramp to a compensating ramp current is set based on the user input, and converting the voltage ramp to the compensating ramp current.

In other features, the method includes receiving the input voltage and the output voltage of the converter, outputting, based on the input voltage and the output voltage, a current reference, generating a voltage ramp based on the current reference, receiving a user input corresponding to an inductance value of the inductor, wherein a conversion gain associated with converting the voltage ramp to a compensating ramp current is set based on the user input, and converting the voltage ramp to the compensating ramp current.

BRIEF DESCRIPTION OF THE DRAWINGS

The present disclosure will become more fully understood from the detailed description and the accompanying drawings, wherein:

FIG. 1 is an example DC-DC converter system according to the principles of the present disclosure;

FIG. 2 illustrates an example ramp waveform;

In the drawings, reference numbers may be reused to identify similar and/or identical elements.

DETAILED DESCRIPTION

Figure 3:
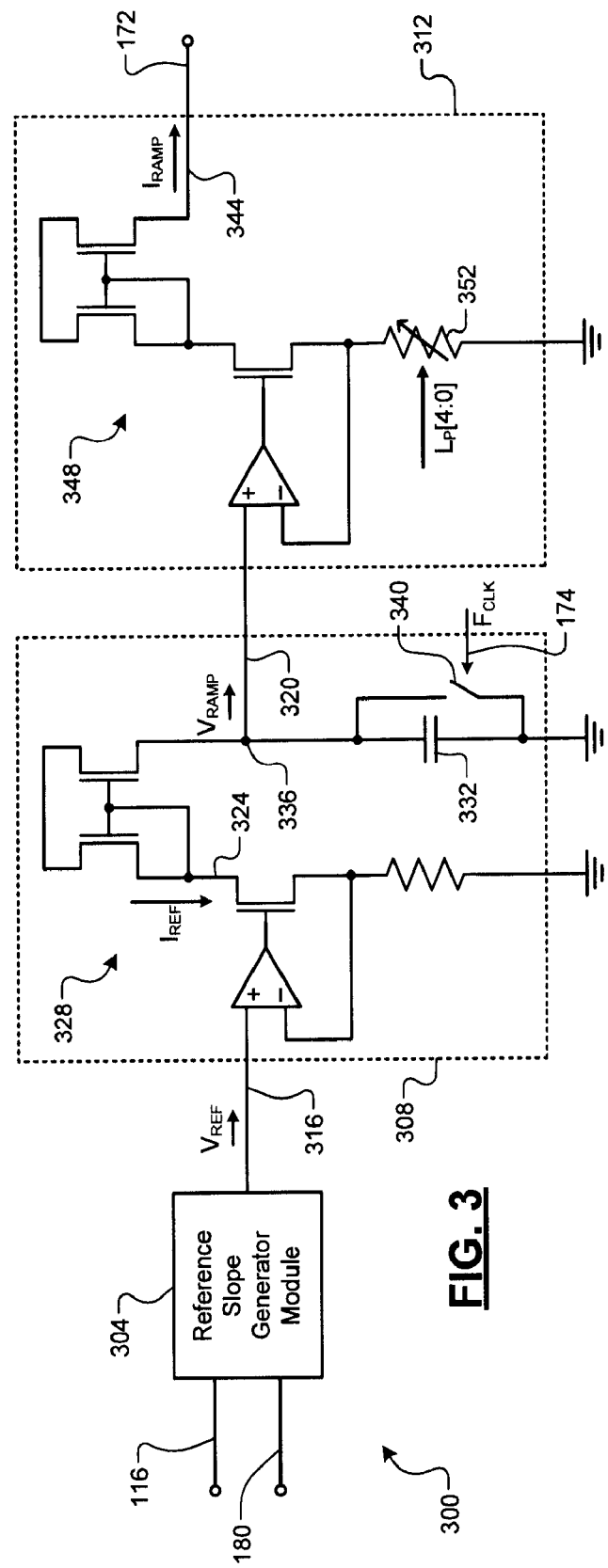
FIG. 3 is an example compensating ramp generator module according to the principles of the present disclosure.

A DC-DC converter may implement current mode control. For example, the DC-DC converter is operated according to a desired duty cycle. The duty cycle is controlled according to a voltage ramp or a current ramp to selectively increase and decrease the duty cycle. In current mode control, a sensed current ramp (e.g., a sawtooth ramp) is used to control the duty cycle. The sensed current ramp is based on, for example, a sensed current through the inductor of the DC-DC converter. For example only, the sensed current ramp may be summed with a compensating ramp signal.

Fixed frequency current mode control architecture requires a compensating ramp to be summed with the sensed inductor current to eliminate potential sub-harmonic oscillations that may be caused when a sensed duty cycle is greater than, for example only, 50%. If the compensating ramp is too small, the system may be subject to sub-harmonic oscillation. Conversely, if the compensating ramp is too large, some system performance characteristics (e.g., bandwidth, phase margin) may be degraded. Accordingly, an example optimal value of the compensating ramp may be a complex function of $V_{IN}$ (an input voltage of the DC-DC converter), $V_{OUT}$ (an output voltage of the DC-DC converter), and L (an inductance value of an inductor of the DC-DC converter). Generally, L is fixed, but $V_{IN}$ and $V_{OUT}$ can vary during operation of the DC-DC converter.

A system according to the principles of the present disclosure automatically adjusts the compensating ramp signal according to any changes in the input and/or output voltage. Further, the compensating ramp signal is adjustable based on L. Accordingly, application design for a user of the DC-DC converter to obtain an optimal compensating ramp signal and system stability is simplified.

Referring now to FIG. 1, an example of a DC-DC converter system 100 with fixed frequency current mode control architecture includes a DC-DC converter 104 and a compensating ramp generator module 108. Although the DC-DC converter 104 is illustrated in a buck DC-DC converter configuration, any suitable DC-DC converter configuration may be used.

A DC power source 112 inputs DC power to the DC-DC converter 104. A voltage input to the converter 104 will be referred to as an input voltage ($V_{IN}$) 116. The converter 104 may include a switching module 120, an inductor (L) 124, and a capacitor (C) 128. The converter 104 outputs DC power to a load 132.

The switching module 120 includes a first switch 136 and a second switch 140. For example only, the first and second switches 136 and 140 may be field effect transistors (FETs) as shown in the example of FIG. 1. In various implementations, such as in the example of FIG. 1, the first and second switches 136 and 140 may be any suitable type of switch, including, but not limited to MOSFET, bipolar junction, and/or DMOS switches.

In the example of FIG. 1, a source terminal of the first switch 136 is connected to the input voltage 116, and a drain terminal of the first switch 136 is connected to a drain terminal of the second switch 140. The source terminal of the second switch 140 is connected to ground. A first end of the inductor 124 is connected to a node 144 between the drain terminal of the first switch 136 and the drain terminal of the second switch 140. A voltage at the node 144 will be referred to as a switching voltage ($V_{SW}$). A second end of the inductor 124 is connected to a first terminal of the capacitor 128. The other terminal of the capacitor 128 may be connected to ground.

The switching module 120 controls connection and disconnection of the inductor 124 and the input voltage 116. Gate terminals of the first and second switches 136 and 140 are connected to a converter control module 148. The converter control module 148 controls operation of the first and second switches 136 and 140. The converter control module 148 controls first and second switches 136 and 140 using pulse width modulation (PWM). More specifically, the converter control module 148 generates first and second PWM signals 152 and 156 (S1 and S2) that are applied to the gate terminals of the first and second switches 136 and 140, respectively.

The converter control module 148 varies the duty cycle of the first and second PWM signals 152 and 156 to control a current $I_L$ through the inductor 124 and, consequently, the output of the converter 104. The duty cycle of a signal refers to a percentage of a predetermined period (e.g., a control loop) that the signal is in an active state. Consequently, the duty cycle corresponds to a percentage of time that the first and second switches 136 and 140 are on and/or off. For example, for the architecture shown in FIG. 1, the duty cycle corresponds to a percentage of time that the first switch 136 is on and the second switch 140 is off.

The converter control module 148 may generate the first and second PWM signals 152 and 156 such that the first and second PWM signals 152 and 156 are substantially complementary. In other words, the first PWM signal 152 applied to the gate terminal of the first switch 136 is generally opposite in polarity to the second PWM signal 156 provided to the second switch 140. When the first switch 136 is on and the second switch 140 is off, the inductor 124 is connected to the input voltage 116, thereby charging the inductor 124. When the first switch 136 is off and the second switch 140 is on, the inductor 124 is disconnected from the input voltage 116 and connected to ground, thereby discharging the inductor 124.

The converter control module 148 controls the first and second PWM signals 152 and 156 according to a sensed current $I_{SENSE}$, which corresponds to the current $I_L$ through the inductor 124. For example, the current $I_L$ may be maintained to correspond to a desired ramp waveform 200 as shown in FIG. 2. The current $I_L$ increases when the first switch 136 is on and the second switch 140 is off, and decreases when the first switch 136 is off and the second switch 140 is on. In particular, the current $I_L$ increases and decreases based on the duty cycles of the first and second PWM signals 152 and 156, which are controlled by the converter control module 148. For example, in a buck converter, the slope of $I_L$ while charging may correspond to $(V_{IN}-V_{OUT})/L$. Conversely, the slope of $I_L$ while discharging may correspond to $V_{OUT}/L$.

The converter control module 148 controls or adjusts the duty cycles of the first and second PWM signals 152 and 156 according to a duty cycle control signal 160. For example, a comparator 164 receives an error compensation signal 168 and the sum of the $I_{SENSE}$ signal and a ramp compensating signal 172 $I_{RAMP}$ and generates the duty cycle control signal 160 accordingly. In this manner, the converter control module 148 controls the duty cycles to maintain the current IL according to the desired ramp waveform 200 to regulate the output voltage of the system 100 to a desired target output voltage. The converter control module 148 receives a clock signal ($F_{cLK}$) 174 to synchronize one of the first and second PWM signals 152 and 156. For example, the converter control module 148 may use the clock signal 174 to synchronize a rising edge of the first PWM signal 152 to control a turn-on instant of the switch 136 (i.e., the rising edge of the first PWM signal 152 is controlled to be synchronous with a rising edge of the clock signal 174 in peak current mode control). Further, the converter control module 148 may use the clock signal 174 to synchronize a rising edge of the second PWM signal 156 to control a turn-on instant of the switch 140 (i.e., the rising edge of the second PWM signal is controlled to be synchronous with the rising edge of the clock signal 174 in valley current mode control.

The compensating ramp generator module 108 generates the compensating ramp signal 172. A summing node 176 (which may implement a summing resistor $R_{SUM}$) sums the compensating ramp signal 172 with the $I_{SENSE}$ signal. For example only the compensating ramp generator module 108 receives the input voltage 116, the output voltage 180 ($V_{OUT}$) of the converter 104, and a user input 184. The user input 184 may correspond to, for example, characteristics of the inductor 124. The compensating ramp generator module 108 generates the compensating ramp signal 172 based on the input voltage 116, the output voltage 180, and the user input 184. Accordingly, the compensating ramp signal 172 automatically compensates for variations in the input voltage 116 and the output voltage 180.

An error amplifier 196 outputs the error compensation signal 168. The error amplifier 196 receives the feedback voltage ($V_{FB}$) 188 and the voltage reference ($V_{REF}$) 198 and outputs the error compensation signal 168, which is proportional to the difference between the feedback voltage 188 and the voltage reference 198.

For example only, a conversion gain between the inductor current IL and $I_{SENSE}$ may correspond to $A_{CS}$. Inductor current charge and discharge slopes (i.e., the slopes of $I_L$ while charging and discharging, respectively) are converted in slopes of $I_{SENSE}$ according to $S_F=[(V_{IN}-V_{OUT})/L]*A_{CS}$ for the charging slope and $S_N=(V_{OUT}/L)*A_{CS}$ for the discharging slope, where $A_{CS}$ corresponds to a current sense gain (e.g., a gain associated with sensing $I_{SENSE}$). Generally, the compensating ramp signal 172 is summed with $I_{SENSE}$ during a "sensed" phase (i.e., during charging for peak current mode control and discharging for valley current mode control). Generally, the compensating ramp for a current mode converter corresponds to $S_e/S_f=1-0.18/D$, where $S_e$ corresponds to the slope of the compensating ramp signal 172, D corresponds to the ratio between the duration of the "sensed" phase and the clock period, and $S_f$ is the slope of $I_{SENSE}$ during the "non-sensed" phase (i.e., during discharging for peak current mode control and charging for valley current mode control). Although these relationships are generally applicable, converter topology and control architecture may vary.

Accordingly, for a buck converter with valley current mode control architecture, the compensating ramp slope corresponds to $S_e=[(0.82*V_{IN}-V_{OUT})/L]*A_{CS}$. As such, the ramp compensating signal 172 is a function of $V_{IN}$, $V_{OUT}$, L, and $A_{CS}$. Those skilled in the art can appreciate that the above relationships may only be applicable to the converter 104 as shown, and different equations and/or relationships may be associated with different converter arrangements.

Referring now to FIG. 3, an example compensating ramp generator module 300 receives the input voltage 116, the output voltage 180, and the user input 184 and generates the ramp compensating signal 172 accordingly. The compensating ramp generator module 300 may receive a clock signal (e.g., the clock signal 174 as shown in FIG. 1, or another clock signal) and reset the ramp compensating signal 172 based on the clock signal. The ramp generator module 300 may include, for example only, a reference slope generator module 304, a voltage ramp generator module 308, and a ramp converter module 312.

The reference slope generator module 304 receives the input voltage 116 and the output voltage 180 and outputs a voltage reference ($V_{REF}$) 316 corresponding to a reference slope. For example, the input voltage 116 and the output voltage 180 as described in FIG. 1 may be continuously sensed (e.g., sampled) and provided to the slope generator module 304. The slope generator module 304 automatically adjusts the voltage reference 316 based on the sensed input voltage 116 and output voltage 180.

The voltage ramp generator module 308 receives the voltage reference 316 and converts the voltage reference 316 to a voltage ramp 320. For example, the voltage ramp generator module 308 corresponds to a voltage to current (V2I) converter that converts the voltage reference 316 to a current reference ($I_{REF}$) 324 For example only, $I_{REF}$ is mirrored (e.g., via current mirror 328). An output of the current mirror 328 is provided to a capacitor 332 to generate a voltage ramp $V_{RAMP}$ at node 336. At each rising clock edge (e.g., of the clock signal 174), the capacitor 332 is discharged to ground via a switch 340 (i.e., when the switch 340 is closed) to generate a periodic sawtooth waveform having a period set by the clock signal 174.

The ramp converter module 312 converts the voltage ramp 320 to the compensating ramp signal 172, which corresponds to the compensating ramp current ($I_{RAMP}$) 344. For example, the ramp converter module 312 corresponds to a voltage to current (V2I) converter and a current mirror 348.

The compensating ramp signal 172 is further based on the user input 184. For example, the user input 184 is used to program an adjustable resistor 352, which is used to set the conversion gain between $V_{RAMP}$ 336 and $I_{RAMP}$ 344 (i.e., the gain of the ramp converter module 312). The user input 184 corresponds to characteristics of the inductor 124 as shown in FIG. 1. For example only, the user input 184 corresponds to the inductance value L of the inductor 124. The user input 184 may correspond to a digital input including a plurality of bits. For example, the user input 184 may include a programming code of five bits [4:0] that correspond to the inductance value of the inductor 124 and adjust a value of the adjustable resistor 352 accordingly. For example only, a user may be provided with a lookup table that correlates various inductance values with corresponding programming codes. In this manner, the optimal ramp compensating signal is generated based on selection of the inductor 124, the input voltage 116, and the output voltage 180.

Figures 4, 5:
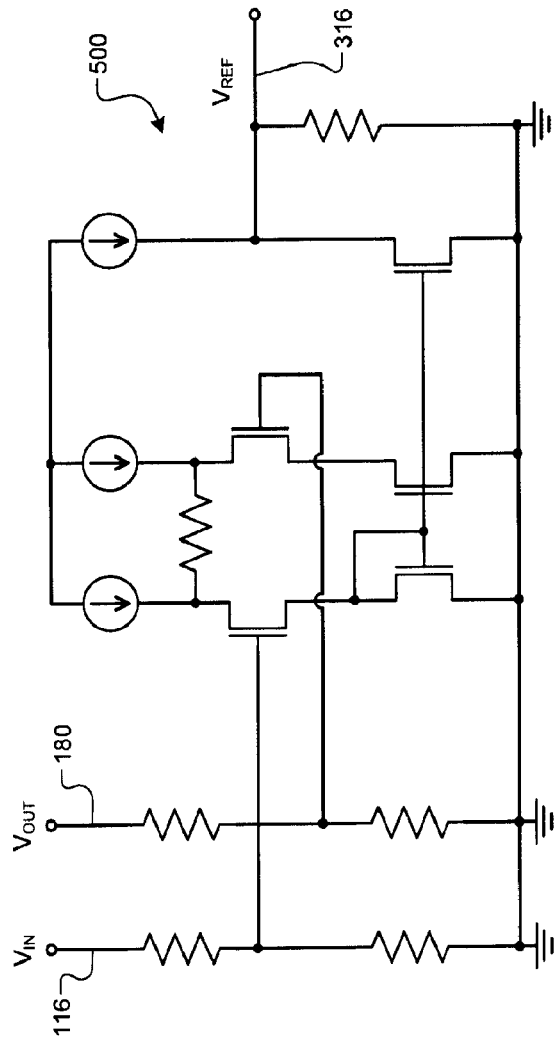
FIG. 4 is an example lookup table correlating an inductance value L with a digital user input value.
FIG. 5 is an example reference slope generator module according to the principles of the present disclosure.

In another implementation, the resistor 352 may have a fixed value, and the user input 184 is instead used to program a value of an adjustable capacitor (e.g., the capacitor 332). In other words, in this implementation, the value of the resistor 352 is fixed and the value of the capacitor 332 is adjustable by the user according to the inductor value L. In still another implementation, the user input 184 corresponds to one or more external components connectable by the user. For example, the user may connect an external component such as a resistor or a capacitor. The value of the external resistor or capacitor is detected and decoded to automatically adjust the value of the resistor 352. Alternatively, the user may replace the resistor 352 with a different resistor according to the inductance value L, and/or may replace the capacitor 332 with a different capacitor according to the inductance value L. A lookup table 400 shown in FIG. 4 illustrates an example correlation between inductance values L and digital user input values (code). In other implementations, the lookup table may 400 illustrate an example correlation between inductance values L and values of external components.

Further, although FIG. 3 illustrates an example compensating ramp generator module 300 having the voltage ramp generator module 308 including the current mirror 328, other arrangements of the compensating ramp generator module 300 that automatically compensate for $V_{IN}$, $V_{OUT}$, and L are contemplated. It can be appreciated that the compensating ramp generator module 300 may omit one or more components such as the current mirror 328. For example, instead of generating the voltage reference 316 ($V_{REF}$) based on $V_{IN}$ and $V_{OUT}$, the reference slope generator module 304 may instead directly generate the current reference 324 ($I_{REF}$) based on $V_{IN}$ and $V_{OUT}$. The reference slope generator module 304 provides the current reference 324 directly to the capacitor 332 to generate $V_{RAMP}$ 336.

Referring now to FIG. 5, an example reference slope generator module 500 is shown. The reference slope generator module 500 generates the voltage reference 316 based on the input voltage 116 and the output voltage 180. Those skilled in the art can appreciate that the circuit arrangement of the reference slope generator module 500 for generating the voltage reference 316 is presented for example only.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system for generating a compensating ramp for a DC-DC converter having fixed frequency current mode control architecture, the system being adaptive to an input voltage of the converter and an output voltage of the converter, and being programmable based on an inductor of the converter, the system comprising:
    a reference slope generator module that receives the input voltage and the output voltage of the converter and that outputs, based on the input voltage and the output voltage, a voltage reference;
    a voltage ramp generator module that receives the voltage reference and that generates a voltage ramp based on the voltage reference; and
    a ramp converter module that i) receives the voltage ramp and a user input, wherein the ramp converter module includes a comparator having a first input that receives the voltage ramp and a second input connected to a programmable resistor, wherein the programmable resistor receives the user input, wherein the user input includes a digital input corresponding to an inductance value of the inductor, and wherein a conversion gain associated with at least one of the voltage ramp generator module and the ramp converter module is set based on the user input, and ii) converts the voltage ramp to a compensating ramp current.

2. The system of claim 1, wherein the digital input includes a plurality of bits.

3. The system of claim 2, wherein the user input adjusts a resistance value of the programmable resistor.

4. The system of claim 1, further comprising a converter control module that controls a first switch and a second switch according to a duty cycle, wherein the duty cycle is based on the compensating ramp current.

5. The system of claim 4, further comprising a summing node that outputs a sum of the compensating ramp current and a current sense signal, wherein the current sense signal corresponds to a current through the inductor, and wherein the duty cycle is based on the sum.

6. The system of claim 1, wherein the voltage ramp generator module includes a voltage to current converter that converts the voltage reference to a current reference and outputs the voltage ramp based on the current reference.

7. The system of claim 1, wherein the ramp converter module includes a voltage to current converter that converts the voltage ramp to the compensating ramp current.

8. A system for generating a compensating ramp for a DC-DC converter having fixed frequency current mode control architecture, the system being adaptive to an input voltage of the converter and an output voltage of the converter, and being programmable based on an inductor of the converter, the system comprising:
    a reference slope generator module that receives the input voltage and the output voltage of the converter and that outputs, based on the input voltage and the output voltage, a current reference;
    a voltage ramp generator module that receives the current reference and that generates a voltage ramp based on the current reference; and
    a ramp converter module that i) receives the voltage ramp and a user input corresponding to an inductance value of the inductor, wherein the ramp converter module includes a comparator having a first input that receives the voltage ramp and a second input connected to a programmable resistor, wherein the programmable resistor receives the user input, wherein the user input includes a digital input corresponding to an inductance value of the inductor, and wherein a conversion gain associated with at least one of the voltage ramp generator module and the ramp converter module is set based on the user input, and ii) converts the voltage ramp to a compensating ramp current.

9. The system of claim 8, wherein the digital input includes a plurality of bits.

10. The system of claim 9, wherein the user input adjusts a resistance value of the programmable resistor.

11. A method for generating a compensating ramp for a DC-DC converter having fixed frequency current mode control architecture, the method being adaptive to an input voltage of the converter and an output voltage of the converter, and being programmable based on an inductor of the converter, the method comprising:
    receiving the input voltage and the output voltage of the converter;
    outputting, based on the input voltage and the output voltage, a voltage reference;
    generating a voltage ramp based on the voltage reference;
    receiving i) at a first input of a comparator, the voltage ramp, and ii) at a programmable resistor, a user input corresponding to an inductance value of the inductor, wherein a second input of the comparator is connected to the programmable resistor, wherein the user input includes a digital input corresponding to an inductance value of the inductor, and wherein a conversion gain associated with converting the voltage ramp to a compensating ramp current is set based on the user input; and converting the voltage ramp to the compensating ramp current.

12. The method of claim 11, wherein digital input includes a plurality of bits.

13. The method of claim 12, further comprising adjusting a resistance value of the programmable resistor based on the user input.

14. A method for generating a compensating ramp for a DC-DC converter having fixed frequency current mode control architecture, the method being adaptive to an input voltage of the converter and an output voltage of the converter, and being programmable based on an inductor of the converter, the method comprising:

receiving the input voltage and the output voltage of the converter;

outputting, based on the input voltage and the output voltage, a current reference;

generating a voltage ramp based on the current reference;

receiving i) at a first input of a comparator, the voltage ramp, and ii) at a programmable resistor, a user input corresponding to an inductance value of the inductor, wherein a second input of the comparator is connected to the programmable resistor, wherein the user input includes a digital input corresponding to an inductance value of the inductor, and wherein a conversion gain associated with converting the voltage ramp to a compensating ramp current is set based on the user input; and converting the voltage ramp to the compensating ramp current based on the user input.

15. The method of claim 14, wherein the digital input includes a plurality of bits.

16. The method of claim 15, further comprising adjusting a resistance value of the programmable resistor based on the user input.

* * * * *

UNITED STATES PATENT AND TRADEMARK OFFICE
CERTIFICATE OF CORRECTION

PATENT NO. : 9,081,403 B1
APPLICATION NO. : 13/799250
DATED : July 14, 2015
INVENTOR(S) : Salvatore Leone et al.

Page 1 of 1

It is certified that error appears in the above-identified patent and that said Letters Patent is hereby corrected as shown below:

In the Specification:

| | |
|---|---|
| Column 4, Line 34 | Delete "IL" and insert --$I_L$-- |
| Column 4, Line 38 | Delete "($F_{cLK}$)" and insert --($F_{CLK}$)-- |
| Column 5, Line 5 | Delete "IL" and insert --$I_L$-- |

Signed and Sealed this
First Day of December, 2015

Michelle K. Lee
*Director of the United States Patent and Trademark Office*